United States Patent [19]

Gumienny et al.

[11] Patent Number: 5,295,457
[45] Date of Patent: Mar. 22, 1994

[54] HEAT EXCHANGER

[75] Inventors: Gerd Gumienny, Landsberg a. Lech; Jaroslav Klouda, Fuerstenfeldbruck; Franz Koch, Untermeitingen, all of Fed. Rep. of Germany

[73] Assignee: Rational Grosskuechentechnik Service GmbH, Fed. Rep. of Germany

[21] Appl. No.: 808,741

[22] Filed: Dec. 17, 1991

[30] Foreign Application Priority Data

Jun. 19, 1991 [DE] Fed. Rep. of Germany ....... 4120251

[51] Int. Cl.$^5$ ................ F22B 17/04; F22B 37/10
[52] U.S. Cl. .................... 122/255; 122/253; 122/254; 122/257; 122/258
[58] Field of Search ............ 122/235.23, 253, 254, 122/255, 257, 265, 256, 258

[56] References Cited

U.S. PATENT DOCUMENTS

| 658,096 | 9/1900 | Sedgwick | 122/253 |
| 1,953,587 | 4/1934 | Cain | 122/253 |
| 4,497,283 | 2/1985 | Laspisa et al. | 122/540 X |

FOREIGN PATENT DOCUMENTS 188705 1/1907 Fed. Rep. of Germany ...... 122/253

Primary Examiner—Edward G. Favors
Attorney, Agent, or Firm—Hill, Steadman & Simpson

[57] ABSTRACT

A heat exchanger for use with a heat source for heating a vaporized liquid includes a housing composed of at least two essentially cuboid chambers that lie opposite one another and are connected to one another by at least one inclined pipe and has an arrangement for filling the housing with a vaporized liquid to an adjustable level. Preferably, a plurality of pipes are provided, which are arranged in vertically-extending planes, with the pipes of adjacent planes sloping in opposite directions.

6 Claims, 1 Drawing Sheet

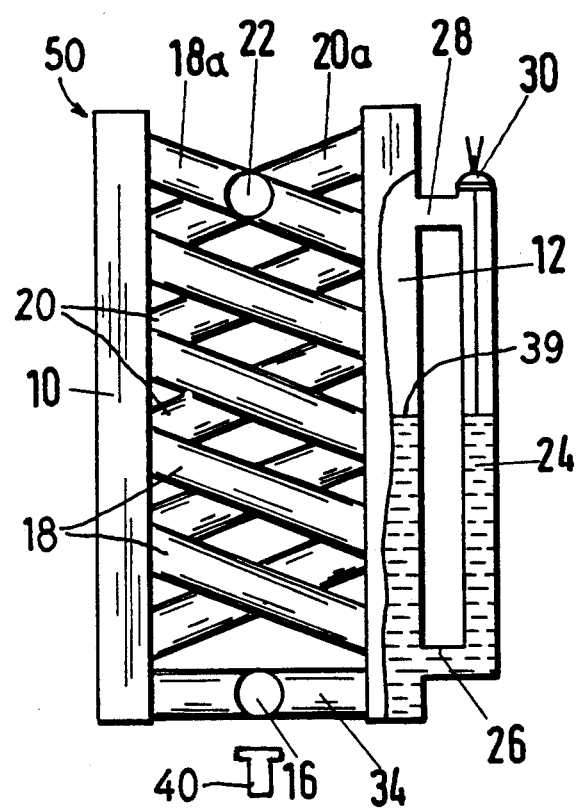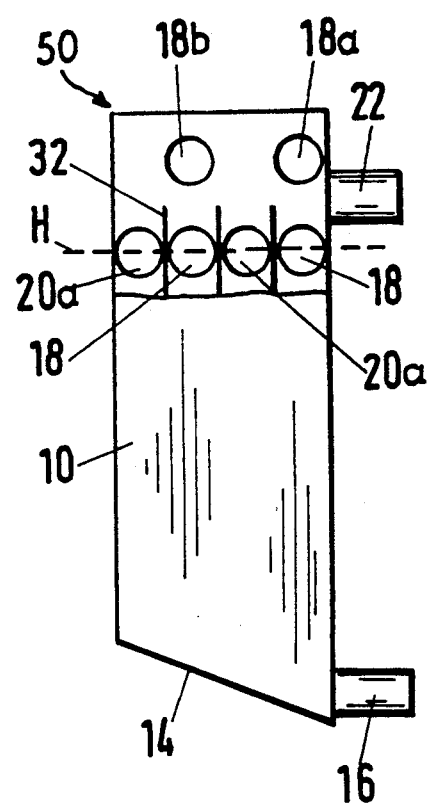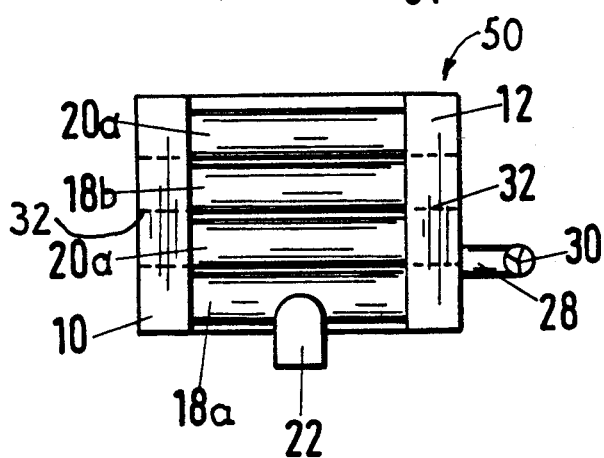

HEAT EXCHANGER

BACKGROUND OF THE INVENTION

The present invention is directed to a heat exchanger which includes a heating source for heating vaporized liquid.

In a heat exchanger having a heat source for heating vaporized liquid, a housing is filled with the liquid, which is generally water. This housing has an optimally large surface in order to guarantee a good heat transfer. Often, the water in the heat exchanger is subjected to a force circulation in order to prevent mechanical stresses that may occur due to a temperature difference and also in order to expel vapor bubbles, which are formed during heating, from the liquid. Such vapor or gas bubbles will reduce the heat transfer, which is the greatest given a complete degree of filling of the heat exchanger with the liquid.

SUMMARY OF THE INVENTION

The object of the present invention is to provide a heat exchanger that has good heat transfer properties and can be used as warranted, both as a steam generator, as well as a steam heater, without additional apparatus cost.

This object is achieved by a heat exchanger which includes a housing which is formed by at least two essentially cuboid chambers that lie opposite one another and are interconnected to one another by at least one pipe, which extends inclined to a horizontal plane, said housing having means for filling the housing with a vaporizable liquid up to an adjustable level.

In accordance with the invention, the heat exchanger comprises the housing, which has at least two essentially cuboid chambers lying opposite one another that are connected to one another, preferably, by a plurality of pipes or tubes which proceed on a slant to a horizontal. Given pipes proceeding on a slant, vapor bubbles occurring in the liquid are rapidly eliminated in an upward direction, mainly to the side or end of the pipe, which is at the upper end. Steam bubbles are, thus, efficiently prevented from collecting in the liquid to be heated and, thus, impede the heat transfer.

The steam temperature can now be varied by changing the liquid level in the housing. When only a part of the heat exchanger housing is filled with liquid, those regions lying further toward the top of the housing and above the liquid level are transversed by the previously-generated steam or vapor, which will become overheated due to contact with the hot walls of the chamber and of the pipes that are not covered by liquid in this region. These temperatures, therefore, will lie noticeably above the temperature of boiling water. In such a heat exchanger, since the steam that comes into contact with a larger contact surface is overheated in comparison to the boiling temperature, the temperature of the generated steam will generally be all the higher with less liquid being provided in the housing to uncover more surfaces.

The pipes or tubes proceeding on a slope itself will remain free of deposits, since these, even when they are a matter of flakes, will move in a downward direction under the influence of the force of gravity. The pipes have a comparatively large diameter and, thus, further oppose any risk of blockage. The elimination of the lime deposits, which occur given hard water or other contaminants, can also be promoted in that the floors of the chambers are inclined to a horizontal plane to a common, lowest point, from which the deposits can be easily removed, for example by rinsing. This principle of the inclined floors for chamber is disclosed in an earlier-filed German Patent Application P 41 02 466.4-16.

It is advantageous to provide at least one other pipe which extends at a slope and is connected to the chambers with the slope of this additional pipe being opposite to that of the earlier pipes.

It is particularly advantageous to provide a plurality of pipes or tubes, wherein the pipes are inclined in opposite directions having their discharges into the chambers arranged neighboring one another. If the pipes are arranged in vertical planes with the slopes of the pipes in one plane changing direction with those in the adjacent plane of pipes, the upward flowing exhaust gas of the burners are respectively lent a tangential motion component that leads to the fact that the exhaust gases, after they have passed a region between pipes lying next to one another, have a privileged direction onto the walls of the chamber that, consequently, are charged with the exhaust gas in an especially beneficial way. This will increase the heat exchange resulting therefrom.

The pipes that differ in slope can be arranged in vertical planes lying essentially perpendicular vis-a-vis the chambers. Only pipes having the same slope, thus, lie in one such vertical plane. The pipes of the opposite slope are arranged in another vertical plane adjacent thereto. This structure has the advantage that it is extremely simple in design.

In all embodiments, the connecting pipes carry the chambers so that the mechanical stresses occurring due to temperature changes can be easily compensated.

At least one vertically arranged partition, which extends at least partially over the height of each chamber, is preferably provided in at least one of the chambers. Vapor or stream bubbles collect at such a partition and these bubbles are then eliminated into the upper region of the heat exchanger.

It is also preferred that the partition or, respectively, partitions are provided in the region between the openings of the pipes having opposite slopes. The vapor bubbles are then immediately conducted out of the pipe and out of the chamber as soon as they have passed one of the slanting pipes. A possible collecting of vapor or steam bubbles in a pipe placed further toward the top is, thus, effectively prevented.

The heat exchanger of the invention can be simultaneously employed as a steam superheater and as a steam generator. This application, for example, can be significant for kitchen equipment and the like. The outlet is provided in the upper region of the heat exchanger for removing the steam.

Other advantages and features of the invention will be readily apparent from the following description of the preferred embodiments, the drawings and claims.

BRIEF DESCRIPTION OF THE DRAWINGS

FIG. 1 is a schematic front view with portions broken away for purposes of illustration of the heat exchanger of the present invention;

FIG. 2 is a left-side view of the heat exchanger of FIG. 1 with portions broken away for purposes of illustration; and FIG. 3 is a top plan view of the heat exchanger of FIG. 1 in accordance with the present invention.

DESCRIPTION OF THE PREFERRED EMBODIMENTS

The principles of the present invention are particularly useful in a heat exchanger, generally indicated at 50 in FIGS. 1, 2 and 3. The heat exchanger 50 is constructed of two vertically extending, essentially cuboid chambers 10 and 12 that each have a lower floor section or wall 14 which slopes at an incline to a horizontal plane to provide a low spot for each chamber. At approximately their lowest point, the chambers 10 and 12 are connected to one another by a connecting pipe 34, which has an outlet opening 16, that is arranged essentially in the middle of the pipe 34. Deposits and the like that collect on the floor sections 14 can be easily rinsed out or, respectively, bled from each of the chambers through the pipe 34 and opening 16.

Each of the chambers 10 and 12 are in communication with one another on the basis of a plurality of pipes or tubes 18 and 20. As illustrated in FIG. 3, the pipes 18 are aligned in vertical planes which have the pipes 20 in vertical planes interposed therebetween. Each of these planes includes five pipes, such as the five pipes 18 in the plane followed by five pipes 20 in the next adjacent plane. Thus, for example, the pipes 18 in its respective plane extend vertically downward at a slope from the chamber 10 as they proceed toward the chamber 12, while the pipes 20 proceed upward from the chamber 10 to the chamber 12. Thus, the discharge opening of the pipes 18 into the chamber 10 will lie in a plurality of horizontal planes, which also contain the discharge openings of the pipes 20 into the chamber 12. It is also noted, as illustrated in FIG. 2, that the entrance opening for the pipes 20a in the chamber 10 will be in the same horizontal plane H as the discharge opening for the pipes 18. Thus, it is desirable that the entrance of each of the pipes 20 is separated from the discharge of the pipes 18 by a partition, such as 32, which partitions extend vertically in the chamber 10. In order to separate the entrances for the pipe 18 from the discharge of the pipes 20, the chamber 12 also has vertical partitions 32 (See FIG. 3).

To remove steam from the heat exchanger 50, the uppermost pipe 18a, as illustrated in FIGS. 1 and 3, is provided with a steam exit opening 22. Generated steam is, thus, capable of being carried off through this opening 22. The filling of the chambers 10 and 12 with water occurs via a water entrance opening 16. A pipe conduit 24 that has its lower region and its upper region in communication with the chamber 12 by passages 26 and 28, respectively, is arranged to extend parallel to the chamber 12. A filling level sensor 30 is provided at the upper end of the pipe conduit 24 and can have an output used to control addition of water through the opening 16.

This arrangement is filled with liquid, for example water, up to a defined level 39 via a feeder which is connected to a water inlet opening 16. The level 39 is determined by the assistance of the filling level sensor 30. Water is then heated by a gas burner 40 which is positioned or arranged below the heat exchanger 50. The water in the two chambers, as well as the lower connecting pipes, such as 18 and 20, will be heated to create bubbles of steam which become separated from the water and, in the upper regions of the heat exchanger 50, become superheated steam. The thermal energy for heating the water and for superheating the steam is supplied by the exhaust gas of the gas burner 40 that flow around the various pipes 18 and 20 from the bottom toward the top.

As illustrated in FIG. 2, at a level of the horizontal plane H, the exit ends of the pipes 18 are in the same plane as the entrances to the pipes 20a for the chamber 10. In the highest plane, only, respectively, two of the pipes 18a and 18b will discharge into the region of the chamber 10 and, respectively, only two of the pipes 20a will discharge into the upper region of the chamber 12. A steam exit opening 22 is situated approximately in the intersecting region of the uppermost inclined pipes 18a, 18b and 20a and, if desired, could have extension in communication with each of the pipes 20a and 18b. The water admission opening through which deposits, such as lime flakes, etc., can be removed is at the lowest region of the heat exchanger at the interconnecting pipe 34. A vertical partition, such as 32, is respectively situated between the openings of different inclined pipes 18 and 20 into the chambers 10 and 12 with the partition extending nearly down to the floor or base of each of the chambers, but being of such a distance therefrom that the elimination of deposits along the floor or base 14 is not impeded. In the upper region of the chambers 10 and 12, the partitions 32 end somewhat above the highest entrance region of the different inclined pipes 18 and 20. The partitions 32 can be continuous to subdivide the chambers 10 and 12 apart from their uppermost or, respectively, lowermost regions into individual compartments and can, thus, prevent laterally-directed flows. However, they can also be multi-part and comprise recesses or extend only partially over the height of each of the chambers 10 and 12, if this seems expedient.

As previously mentioned, the pipes 18 and 20 are respectively arranged in vertical planes that extend perpendicular to and between the two chambers 10 and 12 and parallel to one another. The partitions 32 are provided in both the chambers 10 and 12 between the vertical planes forming the pipes 18 or 20, respectively. The filling level sensor 30 is situated on the side of the chamber 12.

In the exemplary embodiment shown here, the heat exchanger can be employed both as a steam generator and, simultaneously, as a steam superheater. The superheating will occur as a result of the contact of the steam with the side walls of the chambers 10 and 12 and with the pipes 18 and 20 in the region free of liquid, which is that above the water level 39. In this region above the water level 39, the temperature of the surfaces will be above the boiling point of water and can lie at a temperature of 300° C.

The filling level 39 for the liquid in the heat exchanger, moreover, is also based on the desired steam temperature. If higher temperatures are desired, the level is maintained at a lower position than illustrated in FIG. 1. If less superheating is desired, then a level higher than that illustrated in FIG. 1 can be utilized.

Although various minor modifications may be suggested by those versed in the art, it should be understood that we wish to embody within the scope of the patent granted hereon all such modifications as reasonably and properly come within the scope of our contribution to the art.

We claim:

1. A method of utilizing a heat exhanger comprising a housing composed of at least two essentially cuboid chambers that lie opposite one another and are connected to one another by a plurality of inclined pipes divided into groups with the inclined pipes of one group being inclined at an opposite direction to the incline pipes of the other group, said housing having means for filling the housing with a vaporizable liquid, said method including providing a vaporizable liquid to a level less than the maximum height of said housing, maintaining the output of each group of pipes separate from the intake of the other group of pipes, and heating said liquid to create steam and further heating the housing in the areas above the level of liquid to superheat steam in contact with surfaces thereof.

2. A heat exchanger for use with a heat source for heating vaporizable liquid, said heat exchanger comprising a housing composed of at least two essentially cuboid chambers being positioned opposite one another, a first group of pipes interconnecting the two chambers and extending at an incline relative to a horizontal plane with a first slope, said first group of pipes lying essentially in vertical planes extending perpendicular to the chambers, a second group of pipes interconnecting the two chambers and extending at an incline relative to the horizontal plane with a second slope opposite the first slope, said second group of pipes lying in vertical planes adjacent the vertical planes of the first group, at least one vertically-arranged partition provided in one of the two chambers to extend at least partially over the height of the chamber, and means for filling the housing with a vaporizable liquid up to an adjustable level.

3. A heat exchanger according to claim 2, which includes a partition being provided in each of the two chambers in a region between the discharge of one group of pipes and the entrance to another group of pipes.

4. A heat exchanger for use with a heat source for heating a vaporizable liquid, said heat exchanger comprising a housing composed of at least two essentially cuboid chambers being arranged to extend in a vertical direction lying opposite one another and having a bottom wall, said two chambers being interconnected by a first group of pipes inclined at a first slope to a horizontal plane and arranged in parallel-extending first planes extending vertical to the horizontal plane, a second group of pipes inclined to the horizontal plane in a direction opposite to the first slope and arranged in parallel-extending planes interposed between the planes of the first group, a horizontal pipe interconnecting the two chambers adjacent the bottom walls and said housing having means for filling the housing with a vaporizable liquid to a desired level.

5. A heat exchanger according to claim 4, wherein each bottom wall is inclined to the horizontal plane to form a low point and said horizontal pipe interconnects the low points of the two chambers.

6. A heat exchanger according to claim 4, wherein each of the chambers include vertically extending partitions disposed between openings in the chamber to the first group of pipes and to the second group of pipes so that steam produced in one of the first and second groups of pipes will not flow laterally into the other of the first and second groups of pipes.

* * * * *